(12) United States Patent
Wang et al.

(10) Patent No.: US 10,564,464 B2
(45) Date of Patent: Feb. 18, 2020

(54) DISPLAY DEVICE

(71) Applicant: BOE TECHNOLOGY GROUP CO., LTD., Beijing (CN)

(72) Inventors: Haisheng Wang, Beijing (CN); Yingming Liu, Beijing (CN); Xiaoliang Ding, Beijing (CN); Rui Xu, Beijing (CN); Lijun Zhao, Beijing (CN); Yanan Jia, Beijing (CN); Pinchao Gu, Beijing (CN); Yunke Qin, Beijing (CN); Yuzhen Guo, Beijing (CN); Yanling Han, Beijing (CN); Chun Wei Wu, Beijing (CN); Changfeng Li, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/767,357

(22) PCT Filed: Sep. 15, 2017

(86) PCT No.: PCT/CN2017/101912
§ 371 (c)(1),
(2) Date: Apr. 11, 2018

(87) PCT Pub. No.: WO2018/145461
PCT Pub. Date: Aug. 16, 2018

(65) Prior Publication Data
US 2019/0056613 A1    Feb. 21, 2019

(30) Foreign Application Priority Data
Feb. 7, 2017    (CN) .......................... 2017 1 0067696

(51) Int. Cl.
*G02F 1/1333*    (2006.01)
*G02F 1/155*    (2006.01)
(Continued)

(52) U.S. Cl.
CPC ...... *G02F 1/13338* (2013.01); *G02F 1/13318* (2013.01); *G02F 1/133512* (2013.01);
(Continued)

(58) Field of Classification Search
CPC ............. G02F 1/13338; G02F 1/13318; G02F 2001/13312; G02F 1/155; G02F 1/134309;
(Continued)

(56) References Cited

U.S. PATENT DOCUMENTS 8,072,442 B2    12/2011  Castagner et al.
9,559,239 B2    1/2017   Yamamoto
(Continued)

FOREIGN PATENT DOCUMENTS

CN    104751155 A       7/2015
CN    105678255 A  *    6/2016   ......... G02F 1/13306
(Continued)

OTHER PUBLICATIONS

Search Report and Written Opinion for International Application No. PCT/CN2017/101912 dated Dec. 20, 2017.

*Primary Examiner* — Nathanael R Briggs
*Assistant Examiner* — William D Peterson
(74) *Attorney, Agent, or Firm* — Calfee, Halter & Griswold LLP (57) ABSTRACT

Disclosed is a display device, including a display panel having a plurality of pixel units, a protection cover plate disposed on a light exit surface of the display panel, and a plurality of light sensing devices for pattern recognition disposed on one side of the pixel unit facing away from the light exit surface, and a light collimating member disposed between the protection cover plate and the plurality of light sensing devices, wherein orthogonal projections of the light sensing device and the pixel unit on the display panel do not
(Continued)

overlap each other, and the light collimating member has a light transmitting area above the light sensing device and a light shielding area outside the light transmitting area.

15 Claims, 4 Drawing Sheets

(51) Int. Cl.
    *G02F 1/1343* (2006.01)
    *G02F 1/1335* (2006.01)
    *G02F 1/133* (2006.01)
    *G06K 9/00* (2006.01)
    *G06F 3/042* (2006.01)
    *G02F 1/163* (2006.01)

(52) U.S. Cl.
    CPC ........ *G02F 1/134309* (2013.01); *G02F 1/155* (2013.01); *G02F 1/163* (2013.01); *G06F 3/0421* (2013.01); *G06K 9/00046* (2013.01); *G02F 2001/13312* (2013.01); *G02F 2201/44* (2013.01)

(58) Field of Classification Search
    CPC .. G02F 1/13512; G02F 1/163; G02F 2201/44; G06K 9/00046; G06F 3/0421
    USPC .......................................................... 349/12
    See application file for complete search history.

(56) References Cited

U.S. PATENT DOCUMENTS

| | | | |
|---|---|---|---|
| 9,829,614 | B2* | 11/2017 | Smith .................... G02B 27/58 |
| 2011/0193822 | A1 | 8/2011 | Castangner et al. |
| 2015/0187980 | A1 | 7/2015 | Yamamoto |
| 2017/0103248 | A1 | 4/2017 | Yamamoto |

FOREIGN PATENT DOCUMENTS

| | | |
|---|---|---|
| CN | 105678255 A | 6/2016 |
| CN | 1062955527 A | 4/2017 |
| CN | 106773219 A | 5/2017 |

* cited by examiner

DISPLAY DEVICE

CROSS REFERENCE

This application is based on and claims the benefit of Chinese Patent Application No. 201710067696.3 filed on Feb. 7, 2017 and entitled "Display Device", the entire content of which is incorporated herein by reference in its entirety.

TECHNICAL FIELD

The disclosure relates to the field of display, and in particular, to a device and method for transmitting video signals, and a system for playing video signals.

BACKGROUND

Figure 1:
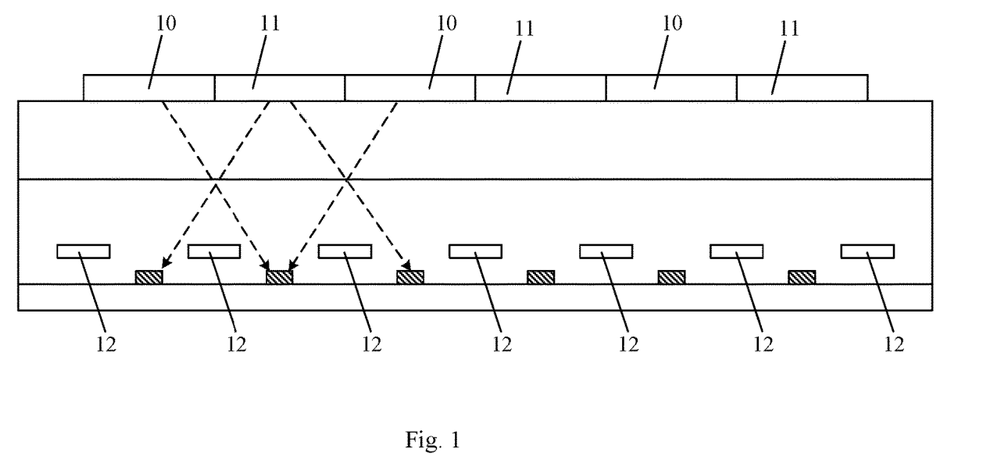
FIG. 1 is a schematic structural diagram of a display device in the related art.

At present, a device for implementing a pattern recognition function for a display device such as a mobile phone is generally mounted at a non-display area such as at the home button or at the back of the display device. In the future, the development trend of the display device is ultra-thin size, high color gamut, wide viewing angle, and integration of various sensing functions. When an optical sensor for implementing pattern recognition is integrated in a display panel, a distance between the sensor and a contact surface of a finger will be enlarged, causing a distance for the light reflected by the finger to the sensor to become larger, and the light reflected by the finger to be scattered before reaching the sensor, as shown in FIG. 1, so that a single optical sensor receives fingerprint information of a plurality of valleys and ridges, resulting in a blurred optical fingerprint pattern, which reduces the accuracy of the pattern recognition.

Therefore, how to ensure that the reflected light of the finger valley ridge is effectively fed back to the corresponding sensor, to avoid the sensor from receiving the display luminescence or other ridge-reflected light, and to improve the accuracy and sharpness of the image of the pattern recognition is an urgent problem to be solved in the art.

SUMMARY

The embodiments of the present disclosure provide a display device including: a display panel having a plurality of pixel units; a protection cover plate disposed on a light exit surface of the display panel; at least one light sensing device for pattern recognition disposed on one side of the pixel unit facing away from the light exit surface; and a light collimating member disposed between the protection cover plate and the plurality of light sensing devices, wherein orthogonal projections of the light sensing device and the pixel unit on the display panel do not overlap each other, and the light collimating member has a light transmitting area above the light sensing device and a light shielding area outside the light transmitting area.

In one possible implementation, in the display device provided by the embodiments of the present disclosure, the light collimating member includes a first light collimating member disposed between the display panel and the protection cover plate, and/or a second light collimating member disposed inside the display panel, the first light collimating member and the second light collimating members correspond to each other and an orthographic projection of the light transmitting area of the first light collimating member and an orthographic projection of the light transmitting area of the second light collimating member on the display panel overlap with each other.

In one possible implementation, in the display device provided by the embodiments of the present disclosure, the light sensing device is disposed in a non-light-emitting area of the display area of the display panel; the first light collimating member and the second light collimating member have the light shielding area only in the non-light-emitting area where the light sensing device is disposed.

In one possible implementation, in the display device provided by the embodiments of the present disclosure, the first light collimating member is a light shielding layer having the light shielding area only in the non-light-emitting area where the light sensing device is disposed.

In one possible implementation, in the display device provided by the embodiments of the present disclosure, the light shielding layer is a metal layer.

In one possible implementation, in the display device provided by the embodiments of the present disclosure, the metal layer includes a plurality of touch detection electrodes.

In one possible implementation, in the display device provided by the embodiments of the present disclosure, the first light collimating member includes: a first transparent electrode layer, an electrochromic layer and a second transparent electrode layer which are sequentially stacked in layers;

the first transparent electrode layer and/or the second transparent electrode layer has a hollow area above the light sensing device, and has an electrode pattern at least in the non-light-emitting area where the light sensing device is disposed;

the electrochromic layer is in a dark state in an area where a predetermined voltage difference exists between the first transparent electrode layer and the second transparent electrode layer, and is in a transparent state in other areas.

In one possible implementation, in the display device provided by the embodiments of the present disclosure, the electrochromic layer and the first transparent electrode layer are disposed on a display area of the display panel as a whole layer, and the second transparent electrode layer has an electrode pattern only in the non-light emitting area where the light sensing device is disposed and has a hollow area above the light sensing device.

In one possible implementation, in the display device provided by the embodiments of the present disclosure, the first light collimating member includes: a first substrate and a second substrate, a liquid crystal layer disposed between the first substrate and the second substrate, and an electrode structure between the first substrate and the second substrate; wherein the electrode structure is configured to control the area of the liquid crystal layer above the light sensing device to be a light transmitting area, and control the non-light emitting area where the light sensing device is disposed to be a light shielding area.

In one possible implementation, in the display device provided by the embodiments of the present disclosure, the display panel includes: a base substrate, a pixel control circuit device disposed on the base substrate, a plurality of light emitting elements disposed on the pixel control circuit device and an encapsulating film covering the light emitting elements; the light sensing device is disposed on a surface of the base substrate facing away from the light emitting element, or is disposed between the base substrate and the pixel control circuit device.

In one possible implementation, in the display device provided by the embodiments of the present disclosure, the second light collimating member includes: a light shielding member disposed in the same as one or combination of a gate film layer and a source-drain film layer in the pixel control circuit device, and anode layers in the light emitting elements, the light shielding member has the light shielding area in the non-light-emitting area where the light sensing device is disposed, and has the light transmitting area above the light sensing device.

In one possible implementation, in the display device provided by the embodiments of the present disclosure, when the second light collimating member includes multiple layers of the light shielding members, an insulating layer between two adjacent light shielding members has a via hole corresponding to the light transmitting area in the light shielding member, and the material of the light shielding member located in the upper layer covers the sidewall of the via hole.

In one possible implementation, in the display device provided by the embodiments of the present disclosure, the display panel includes an array substrate and an opposite substrate, and a liquid crystal layer disposed between the array substrate and the opposite substrate; and the light sensing device is disposed on the surface of the array substrate facing the liquid crystal layer.

In one possible implementation, in the display device provided by the embodiments of the present disclosure, the second light collimating member is a black matrix disposed on one side of the opposite substrate facing the array substrate or disposed on one side of the array substrate facing the opposing substrate, and the black matrix has the light transmitting area above the light sensing device.

In one possible implementation, in the display device provided by the embodiments of the present disclosure, the display panel includes: an array substrate and an opposite substrate, and a liquid crystal layer disposed between the array substrate and the opposite substrate;

the light sensing device is disposed in a non-display area of the array substrate facing the liquid crystal layer;

the first light collimating member is a black frame disposed on one side of the protection cover plate facing the opposite substrate, and the black frame has the light transmitting area above the light sensing device.

the second light collimating member is a light shielding member disposed in the same layer as a black matrix disposed between the array substrate and the opposite substrate, and the light shielding member has the light transmitting area above the light sensing device.

DETAILED DESCRIPTION

The embodiments of the display device provided by the embodiments of the present disclosure will be described in detail below with reference to the accompanying drawings.

Figure 2:
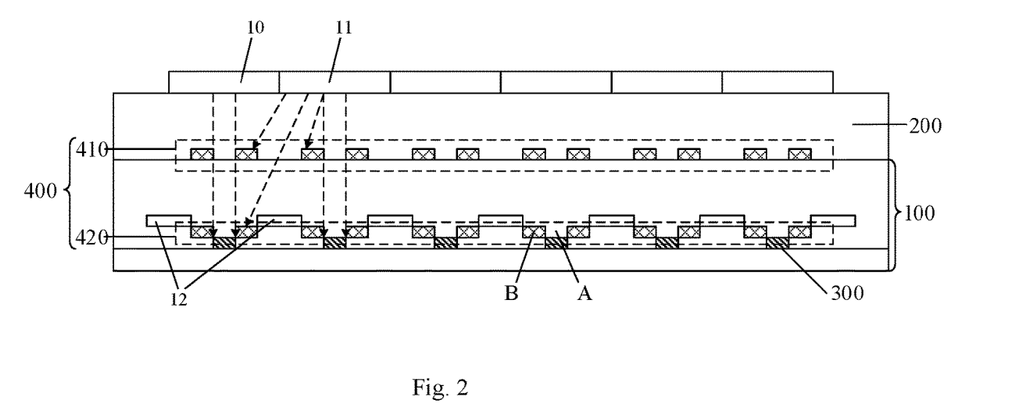
FIG. 2 is a schematic structural diagram of a display device provided by an embodiment of the present disclosure.

An embodiment of the present disclosure provides a display device. As shown in FIG. 2, the display device includes: a display panel 100 having a plurality of pixel units 12, a protection cover plate 200 disposed on a light exit surface of the display panel 100, and a plurality of light sensing devices 300 for pattern recognition each disposed on one side of one of the pixel units 12 facing away from the light exit surface, and a light collimating member 400 disposed between the protection cover plate 200 and the plurality of light sensing devices 300.

Orthogonal projections of the light sensing devices 300 and the pixel units 12 on the display panel 100 do not overlap each other.

The light collimating member 400 has a light transmitting area A above the light sensing device 300 and a light shielding area B outside the light transmitting area A.

Since in the above mentioned display device provided in the embodiment of the present disclosure, a light collimating member 400 is additionally disposed between the protection cover plate 200 and the plurality of light sensing devices 300, and the light collimating member 400 has a light transmitting area A above the light sensing device 300 and a light shielding area B outside the light transmitting area A. The light shielding area B may filter part of stray light from the adjacent valley and ridge (i.e., a ridge 10 and a valley 11) and display light emitted by the pixel unit to be incident on the light sensing device 300. The light transmitting area A can ensure that light reflected by the valley and the ridge is effectively incident on the corresponding light sensing device 300, so as to increase the recognition rate on the pattern by the light sensing device, thereby improving the accuracy and sharpness of the image to be recognized for pattern recognition.

Figure 3A:
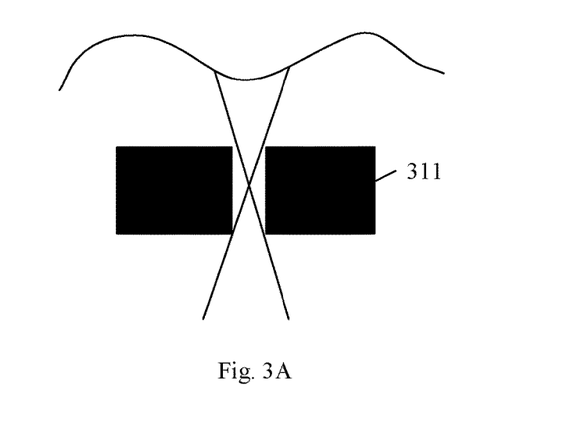
FIGS. 3A and 3B are respectively schematic diagrams of a light-collimating component in a display device provided by an embodiment of the present disclosure.
Figure 3B:
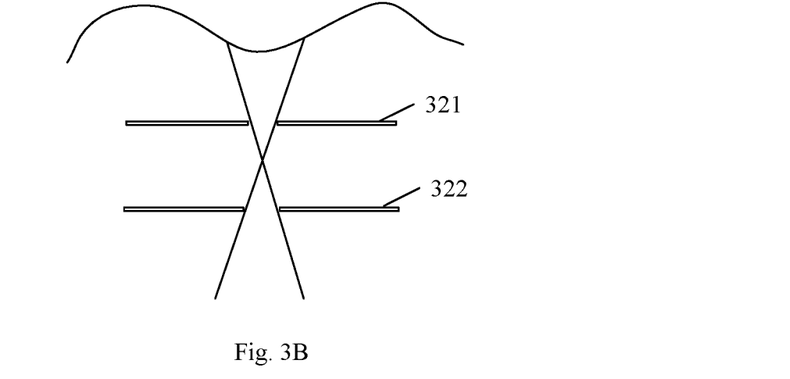

In a possible implementation, in order to ensure that the light reflected by the valley and the ridge with a smaller angle is incident on the corresponding light sensing device 300, it is necessary to ensure that the light collimating member 400 has a certain thickness. When the thickness of the light collimating member 400 is thicker, the observation angle for the light can be made smaller, and a more similar to the effect of collimated light can be obtained. According to measurement, as shown in FIG. 3A, when the aperture of the light transmitting area A of the light collimating member 400 has a diameter of 5 μm, the thickness of the light collimating member 400 is required to be above 100 μm to achieve a good collimation effect. On the one hand, the current production process cannot achieve such a high film thickness. On the other hand, if such a thick film layer is added inside the display panel, it may be detrimental to the light and thin design of the display panel. In view of this, in the above mentioned display device provided by the embodiment of the present disclosure, as shown in FIG. 3B, a plurality of film layers (for example, the upper and lower film layers 321 and 322 shown in FIG. 3B) disposed stacked in layers and having a preset pitch are employed to replace a film layer requiring a large thickness (for example, the film layer 311 shown in FIG. 3A) as a light collimating member 400, to achieve an equivalent light collimation effect.

In view of this, in the above mentioned display device provided by the embodiment of the present disclosure, as shown in FIG. 2, the light collimating member 400 may include: a first light collimating member 410 disposed between the display panel 100 and the protection cover plate 200 and a second light collimating member 420 disposed inside the display panel 100. The first light collimating member 410 and the second light collimating member 420 correspond to each other and an orthographic projection of the light transmitting area A of the first light collimating member 410 and an orthographic projection of the light transmitting area A of the second light collimating member 420 on the display panel 100 overlap with each other, that is the light transmitting areas A of the first light collimating member 410 and the second light collimating member 420 correspond to each other. Alternatively, in one embodiment, the orthogonal projections of the light transmitting areas A of the two on the display panel 100 completely overlap, that is, the light transmitting areas A of both are completely consistent. Alternatively, the light collimating member 400 may only have the first light collimating member 410 disposed between the display panel 100 and the protection cover plate 200, or only the second light collimating member 420 disposed inside the display panel 100, which is not limited herein. In addition, it should be noted that although the first light collimating member 410 is shown as being embedded in the surface of the protection cover plate 200 in the drawings, the present disclosure is not limited thereto. The light collimating member 410 may also protrude from the protection cover plate, or may be disposed at other positions between the protection cover plate 200 and the display panel 100.

The following is an example in which the light collimating member 400 includes both of the first light collimating member 410 and the second light collimating member 420.

In a possible implementation, in order to improve the portability and reduce the cost of the display device, the light sensing device 300 may be integrated in the display area of the display panel 100. At this time, in the above mentioned display device provided by the embodiment of the present disclosure, the light sensing device 300 is generally set in the non-non-light emitting area of the display area of the display panel 100, that is, at the gap between the pixel units 12 shown in FIG. 2. At this time, in order not to affect the display function, the first light collimating member 410 and the second light collimating member 420 have the light shielding area B only in the non-light-emitting area where the light sensing device 300 is disposed. The light shielding area B of the first light collimating member 410 may filter part of stray light from the valley and the ridge, and the light shielding area B of the second light collimating member 420 may not only filter part of stray light from the valley and the ridge above, but also may block most of the display light incident on the light sensing device 300.

In a possible implementation, when the light sensing device 300 is disposed in the non-light-emitting area of the display area of the display panel 100, the first light collimating member 410 and the second light collimating member 420 in the above mentioned display device provided by the embodiments of the present disclosure have be implemented in variety of ways, which will be described in detail below with reference to possible embodiments.

First Embodiment: Configuration of the First Light Collimating Member 410

Figure 4A:
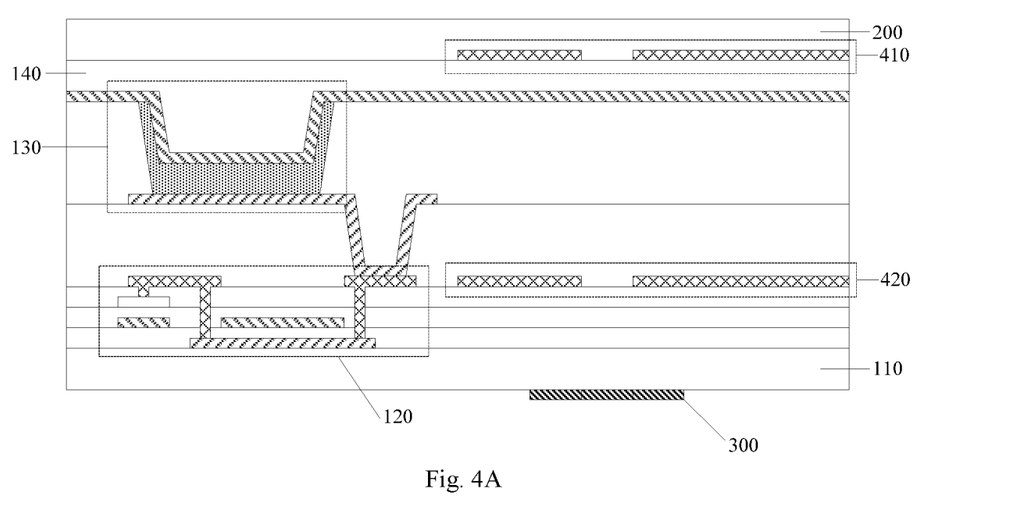
FIGS. 4A to 4D are respectively schematic structural diagrams of an electroluminescent display panel, as a display device provided by an embodiment of the present disclosure.
Figure 4B:
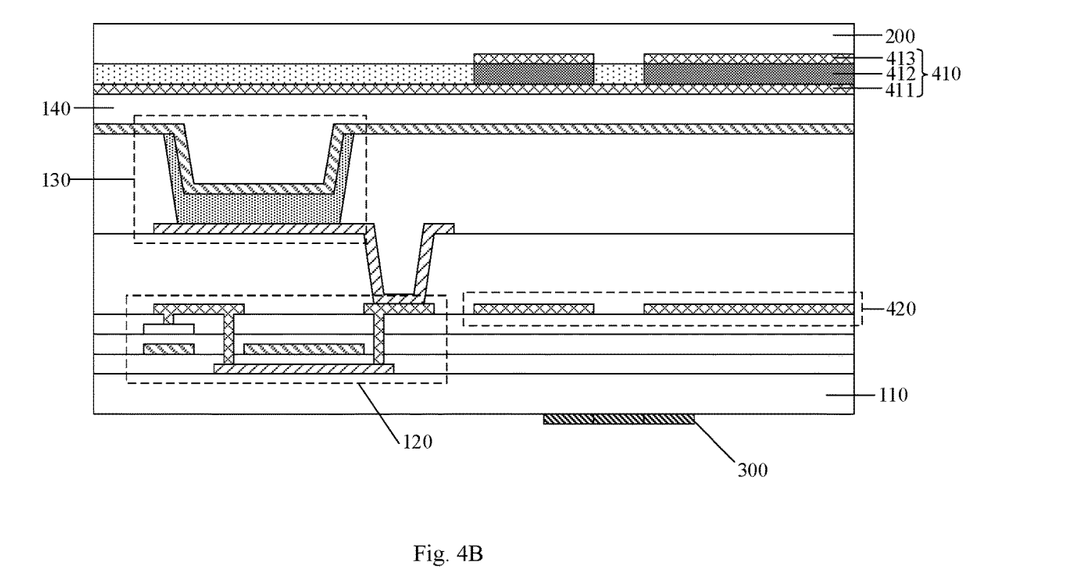
Figure 4C:
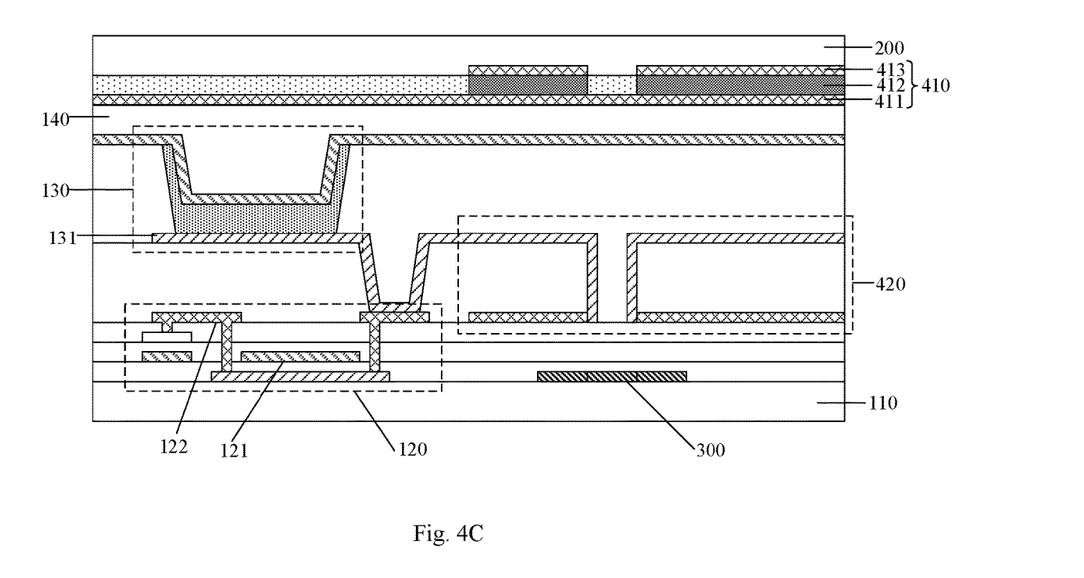
Figure 4D:
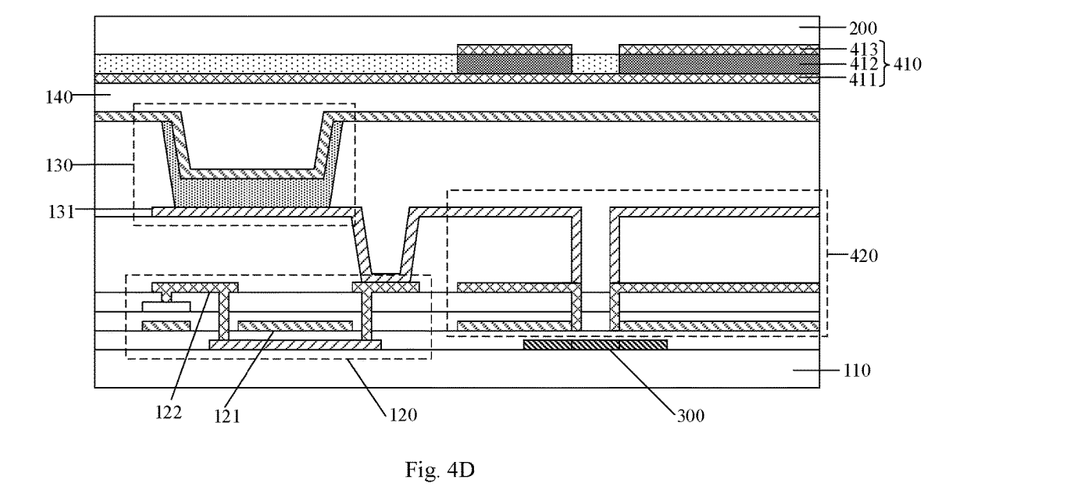
Figure 5A:
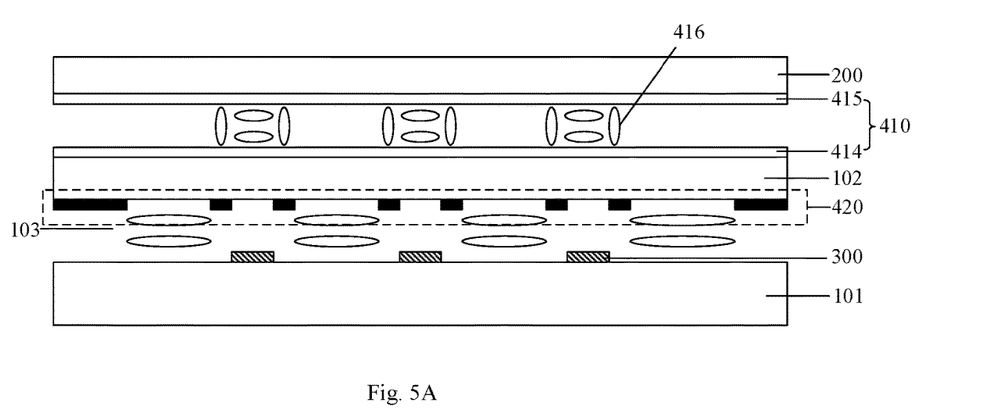
FIGS. 5A and 5B are respectively schematic structural diagrams of a liquid crystal display panel, as a display device provided by an embodiment of the present disclosure.
Figure 5B:
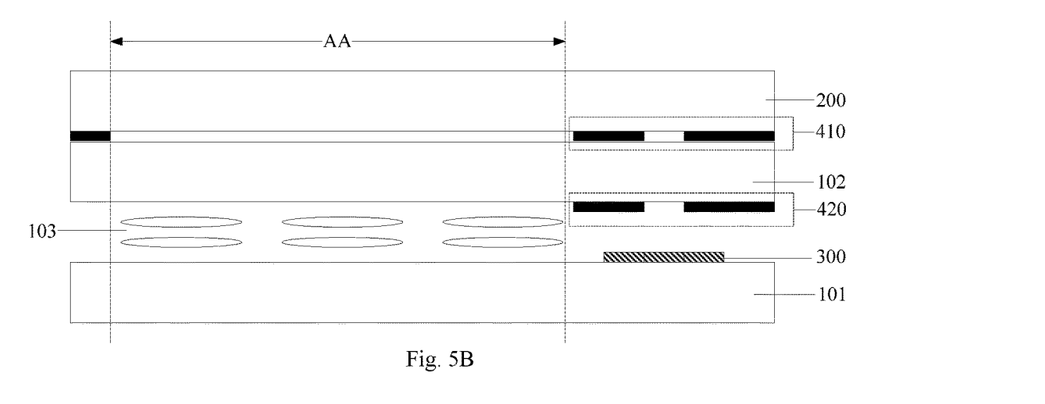

In a possible implementation, in the above mentioned display device provided in the embodiment of the present disclosure, the display panel 100 may be an electroluminescent display panel as shown in FIG. 4A to FIG. 4D, or may also be a liquid crystal display panel as shown in FIG. 5A to FIG. 5B.

When the display panel is an electroluminescent display panel, as shown in FIGS. 4A to 4D, the display panel 100 may include a base substrate 110, a pixel control circuit device 120 disposed over the base substrate 110, and a plurality of light emitting elements 130 disposed over the pixel control circuit device 120, and an encapsulating film 140 covering the light emitting elements 130. The pixel control circuit device 120 is composed of a plurality of thin film transistors, and only a thin film transistor is schematically shown in the figure. In this case, the first light collimating member 410 is disposed between the protection cover plate 200 and the encapsulating film 140. In addition, the light sensing device 300 may be disposed on the surface of one side of the base substrate 110 facing away from the light emitting element 130 as shown in FIG. 4A and FIG. 4B, or may be disposed between the base substrate 110 and the pixel control circuit device 120, which is not limited herein.

When the display panel is a liquid crystal display panel, as shown in FIGS. 5A and 5B, the display panel 100 includes an array substrate 101 and an opposite substrate 102, and a liquid crystal layer 103 disposed between the array substrate 101 and the opposite substrate 102. At this time, as shown in FIG. 5B, the first light collimating member 410 is disposed between the protection cover plate 200 and the opposite substrate 102. In addition, the light sensing device 300 may be disposed on the surface of the array substrate 101 facing the liquid crystal layer 103 as shown in FIGS. 5A and 5B.

Taking the display panel being the electroluminescent display panel as an example, as shown in FIG. 4A, the first light collimating member 410 may be a light shielding layer having a light shielding area B only in a non-light-emitting area where the light sensing device 300 is disposed.

In this case, the light shielding layer may be made of metal, that is, the light shielding layer in the above display device provided in the embodiment of the present disclosure may be a metal layer. The number of metal layers may be one layer or two layers, which is not limited herein.

In a possible implementation, the metal layer in the above display device provided in the embodiment of the present disclosure can also be reused as a touch detection electrode, i.e., the metal layer may constitute a plurality of touch detection electrodes, and each of the touch detection electrodes may be a metal grid-like structure and the capacitive touch sensing can be implemented, which is not limited herein.

In this case, since the current metal layer is generally formed by sputtering, the thickness of the metal layer is affected by factors such as manufacturing process and etching, and the thickness of the metal layer produced is generally on the order of nm, which cannot be achieved in the order of µm. In this case, the filtering effect on the stray light of the ridge and the valley is not very large, and there will be stray light of a relatively large angle entering the display panel, reaching the light sensing device 300 after passing through the second light collimating member 420, and the light sensing device 300 may receive light containing mixed light from the ridge and the valley, resulting in lower recognition rate.

In view of this, in the above mentioned display device provided by the embodiments of the present disclosure, the first light collimating member 410 having a thickness in the order of µm can be implemented of an electrochromic material. As shown in FIG. 4B, the first light collimating member 410 may include: a first transparent electrode layer 411, an electrochromic layer 412, and a second transparent electrode layer 413 that are sequentially stacked in layers. The first transparent electrode layer 411 and/or the second transparent electrode layer 413 has a hollow area above the light sensing device 300, i.e., an electrodeless pattern, and has an electrode pattern at least in a non-light-emitting area where the light sensing device 300 is disposed. The electrochromic layer 412 is in a dark state in an area where a predetermined voltage difference exists between the first transparent electrode layer 411 and the second transparent electrode layer 413, and is in a transparent state in other areas. That is, the electrochromic layer 412 is in a transparent state with no voltage applied thereto, and forms a light shielding area B when a voltage is applied.

In this way, when the display panel is in the display state, no voltage is applied to the first transparent electrode layer 411 and the second transparent electrode layer 413, and the electrochromic layer 412 is in a transparent state, achieving a normal display. When the finger is placed on the display panel to enable the fingerprint recognition state, the first transparent electrode layer 411 and the second transparent electrode layer 413 are loaded with corresponding potentials, and the electrochromic layer 412 is turned black in the position right facing the first transparent electrode layer 411 and the second transparent electrode layer 413, forming a light transmitting area B. Since the first light collimating member 410 can reach the order of stray light can be well restricted from entering the light sensing device 300, realizing a high-precision fingerprint recognition function.

In a possible implementation, in order to simplify the complexity of the manufacturing process, in the above display device provided by the embodiment of the present disclosure, as shown in FIG. 4B, the electrochromic layer 412 and the first transparent electrode layer 411 may be disposed as a whole layer in the display area of the display panel 100, i.e., without patterning. The second transparent electrode layer 413 may have an electrode pattern only in the non-light emitting area where the light sensing device 300 is disposed and has a hollow area above the light sensing device 300. That is, only the second transparent electrode layer 413 requires patterning. The hollow area may be in a circle hole shape, or in a square hole shape, or other shape, which is not limited herein.

Alternatively, in the display device provided by the embodiment of the present disclosure, the first light collimating member 410 having a thickness in the order of μm may also be implemented of a liquid crystal material. Taking a liquid crystal display panel as an example, as shown in FIG. 5A, the first light collimating member 410 may include a first substrate 414 and a second substrate 415, a liquid crystal layer 416 disposed between the first substrate 414 and the second substrate 415, and electrode structure (not shown in the figure) disposed between the first substrate 414 and the second substrate 415. The electrode structure is configured to control the area of the liquid crystal layer 416 above the light sensing device 300 to be a light transmitting area, and control the non-light emitting area where the light sensing device 300 is disposed to be a light shielding area. There are many possible implementations of electrode structures, which are not limited here.

Further, to reduce the thickness of the display device, in a possible implementation, the first substrate 414 may be the same substrate as the protection cover plate 200, and the second substrate 415 may be the same substrate as the opposite substrate, which is not limited herein.

In this way, when the display panel is in the display state, the electrode structure does not work and a normal display is achieved; when the finger is placed on the display panel to enable the fingerprint recognition state, the electrode structure is configured to control the area of the liquid crystal layer 416 above the light sensing device 300 to be a light transmitting area A and the non-light-emitting area where the light sensing device 300 is disposed to a light shielding areas B. Since the first light collimating member 410 can reach the order of μm, stray light can be well restricted from entering the light sensing device 300 and a high-precision fingerprint recognition function can be realized.

Second Embodiment: Configuration of the Second Light Collimating Member 420

When the display panel is an electroluminescent display panel, in the above mentioned display device provided by the disclosed embodiment, as shown in FIGS. 4A to 4D, the second light collimating member 420 may include: a light shielding member disposed in the same layer as one or combination of the gate film layer 121 and the source-drain film layer 122 in the pixel control circuit device 120 and the anode layer 131 in the light emitting element 130. The light shielding member has a light shielding area in the non-light-emitting area where the light sensing device 300 is disposed, and has the light transmitting area above the light sensing device 300.

FIG. 4A and FIG. 4B show the case where one light shielding member is disposed in the same layer as the source-drain film layer 122. FIG. 4C shows the case where two light shielding members disposed in the same layer as the anode layer 131 and the source-drain film layer 122, respectively. FIG. 4D shows the case where three the case where disposed in the same layer as the anode layer 131, the source-drain film layer 122 and the gate film layer 121, respectively.

Further, in the above mentioned display device provided by the embodiment of the present disclosure, as shown in FIGS. 4C and 4D, when the second light collimating member 420 includes multiple light shielding members, an insulating layer between two adjacent light shielding members has a via hole corresponding to the light transmitting area in the light shielding member, and the material of the light shielding member located in the upper layer covers the sidewall of the via hole. In FIG. 4C, the insulating layer between the anode layer 131 and the source-drain film layer 122 has a via hole in the light transmitting area, and the material of the light shielding member disposed in the same layer as the anode layer 131 covers the sidewall of the via hole. In FIG. 4D, the insulating layer between the gate film layer 121 and the source-drain film layer 122 has a via hole in the light transmitting area, and the material of the light shielding member disposed in the same layer as the source-drain film layer 122 covers the sidewall of the via hole.

When the display panel is a liquid crystal display panel, in the above display device provided by the embodiment of the present disclosure, as shown in FIG. 5A, the second light collimating member 420 may be disposed as a black matrix on the side of the opposite substrate 102 facing the array substrate 101 or on the side of the array substrate 101 facing the opposite substrate 102. The black matrix has a light transmitting area above the light sensing device 300.

Embodiment 3: The Light Sensing Device 300 is Disposed in a Non-Display Area of the Display Panel 100

Since when the light sensing device 300 is disposed in the non-light-emitting area of the display area of the display panel 100, the light collimating member 400 cannot have the light shielding area B disposed in the opening area of the pixel unit 12, stray light is inevitably incident on the light sensing device 300. In the case where the sharpness requirement of the pattern recognition is relatively high, in a possible implementation, in the above mentioned display device provided in the embodiment of the present disclosure, the light sensing device may also be disposed in the non-display area of the display panel.

Taking a display panel being a liquid crystal display panel as an example, in the above display device provided by the embodiment of the present disclosure, as shown in FIG. 5B, the first light collimating member 410 may be a black frame disposed on the surface on the side of the protection cover plate 200 facing the opposite substrate 102. The black frame has a light transmitting area above the light sensing device 300; the second light collimating member 420 may be a light shielding member disposed in the same layer as the black matrix disposed between the array substrate 101 and the opposite substrate 102, and the light shielding member has a light transmitting area above the light sensing device 300.

The display device provided by the embodiment of the present disclosure may be any product or component having a display function such as a mobile phone, a tablet computer, a television, a monitor, a notebook computer, a digital photo frame, a navigator, and the like.

The display device provided by the embodiment of the present disclosure includes a display panel having a plurality of pixel units, a protection cover plate disposed on the light exit surface of the display panel, and a plurality of light sensing devices for pattern recognition each disposed on one side of one of the pixel units facing away from the light exit surface. In the light sensing device, a light collimating member is additionally disposed between the protection cover plate and the plurality of light sensing devices. The light collimating member has a light transmitting area above the light sensing device and has a light shielding area outside the light transmitting area. The light shielding area may filter part of stray light from the adjacent valley and ridge and display light emitted by the pixel unit to be incident on the light sensing device. The light transmitting area can ensure that light reflected by the valley and the ridge is effectively incident on the corresponding light sensing device, so as to increase the recognition rate on the pattern by the light sensing device, thereby improving the accuracy and sharpness of the image to be recognized for pattern recognition It will be apparent to those skilled in the art that various modifications and variations can be made in the present disclosure without departing from the spirit and scope of the disclosure. Thus, if these modifications and variations of the present disclosure fall within the scope of the claims of the present disclosure and their equivalent technologies, the present disclosure is also intended to include these modifications and variations.

What is claimed is:

1. A display device comprising:
a display panel having a plurality of pixel units;
a protection cover plate disposed on a light exit surface of the display panel;
at least one light sensing device for pattern recognition disposed on one side of the plurality of pixel units facing away from the light exit surface; and
a light collimating member disposed between the protection cover plate and the at least one light sensing device,
wherein orthogonal projections of the at least one light sensing device and the plurality of pixel units on the display panel do not overlap each other, and
the light collimating member has a light transmitting area above the light sensing device and a light shielding area outside the light transmitting area, wherein the light collimating member comprises a first light collimating member disposed between the display panel and the protection cover plate.

2. The display device according to claim 1, wherein the light collimating member further comprises a second light collimating member disposed inside the display panel, the first light collimating member and the second light collimating members correspond to each other and an orthographic projection of the light transmitting area of the first light collimating member and an orthographic projection of the light transmitting area of the second light collimating member on the display panel overlap with each other.

3. The display device according to claim 2, wherein the light sensing device is disposed in a non-light-emitting area of the display area of the display panel; the first light collimating member and the second light collimating member have the light shielding area only in the non-light-emitting area where the light sensing device is disposed.

4. The display device according to claim 3, wherein the first light collimating member is a light shielding layer having the light shielding area only in the non-light-emitting area where the light sensing device is disposed.

5. The display device according to claim 4, wherein the light shielding layer is a metal layer.

6. The display device according to claim 5, wherein the metal layer comprises a plurality of touch detection electrodes.

7. The display device according to claim 3, wherein the first light collimating member comprises: a first transparent electrode layer, an electrochromic layer and a second transparent electrode layer which are sequentially stacked in layers;
at least one of the first transparent electrode layer and the second transparent electrode layer has a hollow area above the light sensing device, and has an electrode pattern at least in the non-light-emitting area where the light sensing device is disposed;
the electrochromic layer is in a dark state in an area where a predetermined voltage difference exists between the first transparent electrode layer and the second transparent electrode layer, and is in a transparent state in other areas.

8. The display device according to claim 7, wherein the electrochromic layer and the first transparent electrode layer are disposed on a display area of the display panel as a whole layer, and the second transparent electrode layer has an electrode pattern only in the non-light emitting area where the light sensing device is disposed and has a hollow area above the light sensing device.

9. The display device according to claim 3, wherein the first light collimating member comprises: a first substrate and a second substrate, a liquid crystal layer disposed between the first substrate and the second substrate, and an electrode structure between the first substrate and the second substrate; wherein
the electrode structure is configured to control the area of the liquid crystal layer above the light sensing device to be a light transmitting area, and control the non-light emitting area where the light sensing device is disposed to be a light shielding area.

10. The display device according to claim 3, wherein the display panel comprises: a base substrate, a pixel control circuit device disposed on the base substrate, a plurality of light emitting elements disposed on the pixel control circuit device and an encapsulating film covering the light emitting elements; the light sensing device is disposed on a surface of the base substrate facing away from the light emitting element, or is disposed between the base substrate and the pixel control circuit device.

11. The display device according to claim 10, wherein the second light collimating member comprises: a light shielding member disposed in the same as one or combination of a gate film layer and a source-drain film layer in the pixel control circuit device, and anode layers in the light emitting elements, the light shielding member has the light shielding area in the non-light-emitting area where the light sensing device is disposed, and has the light transmitting area above the light sensing device.

12. The display device according to claim 11, wherein when the second light collimating member comprises multiple layers of the light shielding members, an insulating layer between two adjacent light shielding members has a via hole corresponding to the light transmitting area in the light shielding member, and the material of the light shielding member located in the upper layer covers the sidewall of the via hole.

13. The display device according to claim 3, wherein the display panel comprises an array substrate and an opposite substrate, and a liquid crystal layer disposed between the array substrate and the opposite substrate; and the light sensing device is disposed on the surface of the array substrate facing the liquid crystal layer.

14. The display device according to claim 13, wherein the second light collimating member is a black matrix disposed on one side of the opposite substrate facing the array substrate or disposed on one side of the array substrate facing the opposing substrate, and the black matrix has the light transmitting area above the light sensing device.

15. The display device according to claim 1, wherein the display panel comprises: an array substrate and an opposite substrate, and a liquid crystal layer disposed between the array substrate and the opposite substrate;

the light sensing device is disposed in a non-display area of the array substrate facing the liquid crystal layer;

the first light collimating member is a black frame disposed on one side of the protection cover plate facing the opposite substrate, and the black frame has the light transmitting area above the light sensing device;

the second light collimating member is a light shielding member disposed in the same layer as a black matrix disposed between the array substrate and the opposite substrate, and the light shielding member has the light transmitting area above the light sensing device.

\* \* \* \* \*